Aug. 3, 1965   F. E. WINNEN   3,198,079
AXIALLY ADJUSTABLE TOOL HOLDER
Filed Jan. 22, 1964   2 Sheets-Sheet 2
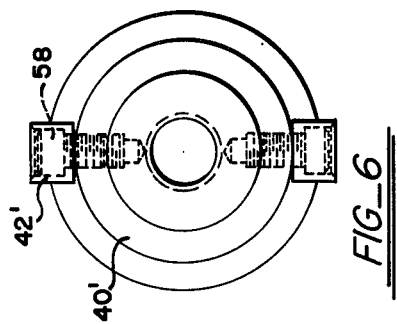
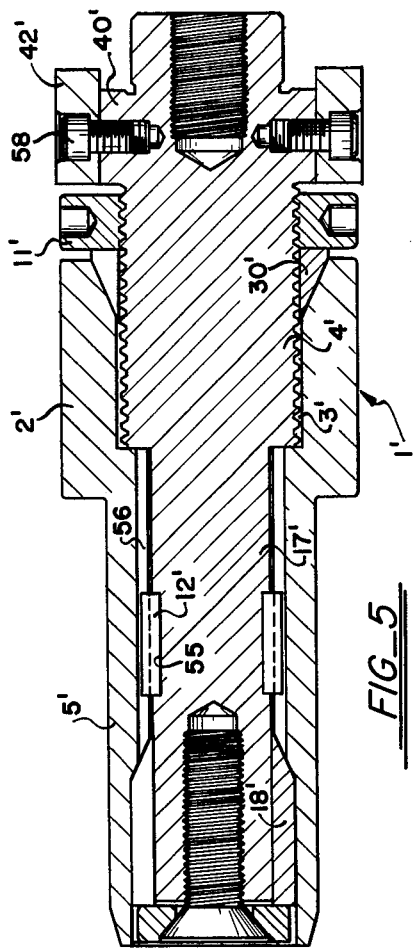
INVENTOR.
FRANKLYN E. WINNEN
BY
*Oberlin, Maky & Donnelly*
ATTORNEYS

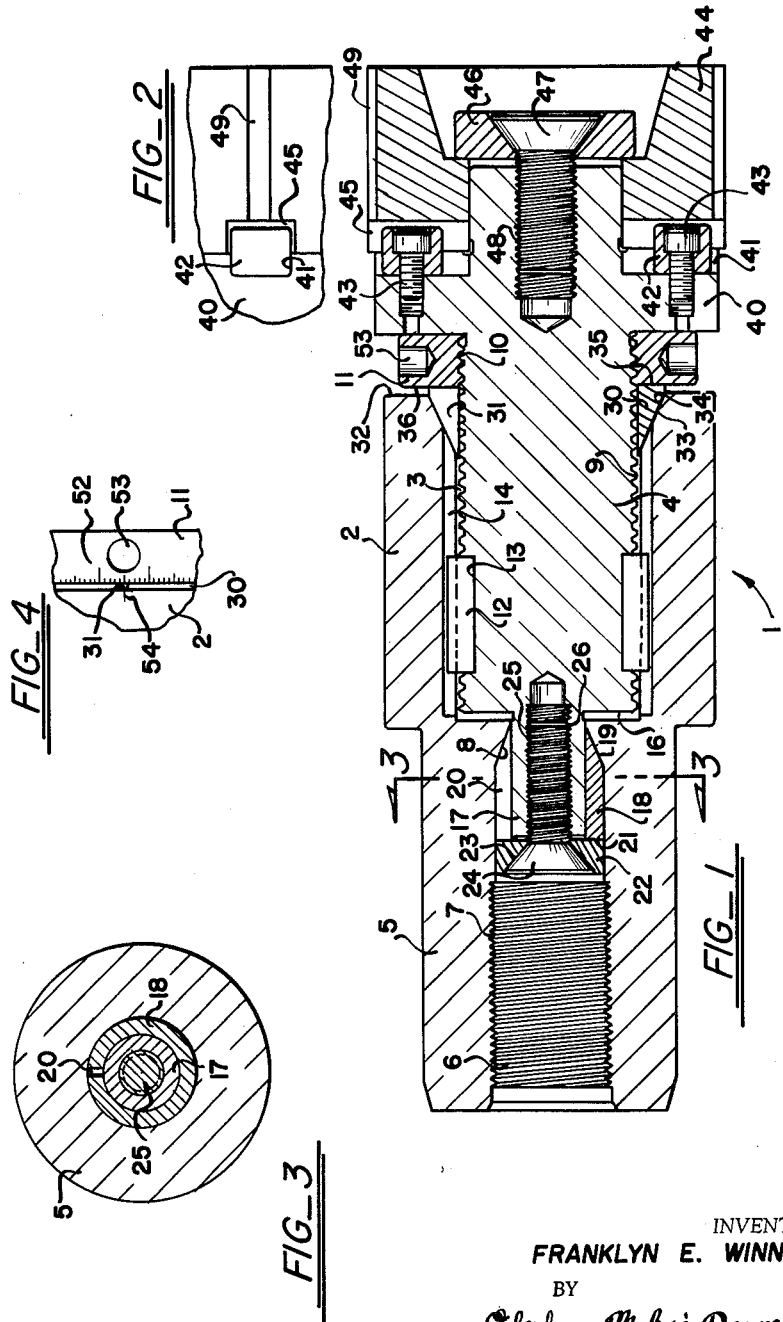

United States Patent Office 3,198,079
Patented Aug. 3, 1965

3,198,079
AXIALLY ADJUSTABLE TOOL HOLDER
Franklyn E. Winnen, Cleveland, Ohio, assignor to Erickson Tool Company, Solon, Ohio, a corporation of Ohio
Filed Jan. 22, 1964, Ser. No. 339,385
10 Claims. (Cl. 90—11)

The present invention relates generally, as indicated, to an axially adjustable tool holder and, more particularly, to a tool holder for adjustably holding a shell mill, end mill, boring bar or the like with a high degree of accuracy.

It is often desirable in machine tool practice to perform metal cutting operations with a great deal of precision and uniformity. In the past, such cutting operations have been performed by the use of a tool holder having a graduated dial for very fine adjustments of the cutting tool. However, the results achieved by such a tool holder have not been entirely satisfactory, since heretofore it has not been possible entirely to eliminate relative radial movement between the body member of the tool holder and the tool holder housing. This has been true even where the dial is provided with a conical surface complemental with an abutment surface on the housing for centering such dial with respect to the axis of a bore in the housing, since there still is diametral clearance or play between the cooperating threads on the dial and body member which allows such undesirable radial or lateral movement. While some of this movement can be eliminated by the use of precision threads, such threads are quite expensive to machine, and even then, not all of the undesirable diametral clearance can be eliminated.

It is therefore a principal object of this invention to provide a tool holder for adjustably holding a cutting element with a high degree of accuracy.

It is another object of this invention to provide a tool holder which is rigidly mounted in a tool holder housing by locking both ends of the tool holder against both lengthwise and lateral movements.

Another object is to provide a tool holder with a split wedge ring for accurately centering the body member in the bore in the body of the tool housing.

Still another object is to provide such a tool holder with a pair of such split wedge rings, one at each end of the body member, to eliminate any radial movement between the body member and housing.

Another object is to provide the housing of a tool holder with a bore having a conical abutment surface adjacent each end operative to cooperate with a pair of tapered split wedge rings for accurately centering a body member within such bore.

A further object is to provide acme or truncated threads on the body member of a tool holder which are adapted to cooperate with a split wedge ring for accurately centering the body member in the bore of a housing.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 1 is a longitudinal section of a preferred form of tool holder in accordance with the present invention;

FIG. 2 is a fragmentary top plan view of the right end of the tool holder of FIG. 1;

FIG. 3 is a vertical section taken on the plane of the line 3—3 of FIG. 1;

FIG. 4 is an enlarged fragmentary top plan view of the graduated dial on the tool holder of FIG. 1;

FIG. 5 is a longitudinal section of another form of tool holder in accordance with the present invention; and FIG. 6 is an end elevation view of the tool holder of FIG. 5 as viewed from the right end thereof.

Referring now in detail to the drawings, and, more particularly, to FIGS. 1-4, there is illustrated a preferred form of a tool holder 1 including a housing 2 having a cylindrical bore 3 in which there is mounted a body member 4. The housing 2 is provided with a shank portion 5 integrally formed therewith and adapted to be secured to the spindle or quill of a metal-working machine or the like (not shown). The shank portion 5 has a central bore 6 concentric with the housing bore 3, such shank bore being internally threaded at 7 and terminating in a frusto-conical seat 8 adjacent one end of the cylindrical bore 3.

That portion of the body member 4 which extends into and beyond the bore 3 is provided with external acme or truncated threads 9 for threaded engagement with a correspondingly internally threaded bore 10 of a dial member 11.

To preclude relative rotational movement between the body member 4 and the housing 2 during a cutting operation, a plurality of keys 12 are press fitted into slots 13 in the body member 4, such keys being adapted to be received in key ways or slideways 14 extending the full length of the bore 13.

Projecting from the inner end 16 of the body member 4 there is a reduced diameter tubular member 17 which projects into the bore 6 of the shank portion 5 beyond the frusto-conical seat 8. A wedge ring 18 surrounds the tubular member 17 and has a tapered surface 19 at its inner end which is complemental with and adapted to engage the coincal seat 8. As can best be seen in FIG. 3 of the drawings, the wedge ring 18 is provided with a longitudinal slot 20 extending the entire length thereof, the purpose of which will be fully explained hereafter.

Adjacent the outer end 21 of the wedge ring 18 there is disposed a thrust washer 22 having a conical bore 23 extending therethrough for receiving the tapered head 24 of a locking screw 25, such screw extending into and threadedly engaging a tapped hole 26 in the tubular member 17.

A second split wedge ring 30 having a longitudinal slot 31 extending the entire length thereof is disposed between end wall 32 of the housing 2 and the dial member 11, such wedge ring having a tapered surface 33 complemental with and adapted to engage a conical abutment surface 34 adjacent the outer end of cylindrical bore 3 and also having a flat opposite end surface 35 which is adapted to engage a flat inner end surface 36 of the dial member 11.

The wedge rings 18 and 30 preferably fit snugly on tubular member 17 and on threads 9 without any radial play whatsoever. Such snug fits may be accomplished as by making the rings 18 and 30 with bores of slightly smaller diameter (.0001″ to .0002″ for example) than the outside diameters of the tubular member 17 and threads 9. Thus, when the wedge rings 18 and 30 are engaged with their respective seats 19 and 34, the axis of the body member 4 will coincide with the axis of bore 3 and seats 19 and 34 despite radial play between the threads 9 and 10 of body member 4 and dial member 11. Furthermore, it is not necessary in the present construction to provide a close sliding fit between threads 9 and bore 3 because the centering of the body member 4 is effected by the snugly fitting and widely spaced wedge rings 18 and 30.

As can readily be seen, tightening of the locking screw 25 against the thrust washer 22 draws the body member 4 toward the left as viewed in FIG. 1 until the end face 35 of the wedge ring 30 engages the end face 36 of the dial member 11 and the tapered portion 33 of the wedge ring is firmly wedged between and forced into engagement with the abutment surface 34 of the housing and the threads 9 on the body member. Such engagement of the wedge ring 30 with the threads 9 and housing 2 accurately centers the outer end of the body member 4 with respect to the axis of the bore 3 and locks the body member 4 in such centered relationship. As previously mentioned, the threads 9 are either acme or truncated threads, thus having flat crests which are not damaged even though firmly frictionally gripped by the wedge ring 30.

While the wedge ring 30 is being compressed in the manner discussed above, wedge ring 18 is being forced toward the right as viewed in FIG. 1. When sufficient axial force is applied through the locking screw 25 and thrust washer 22, the wedge ring 18 is likewise compressed until it firmly frictionally engages both the conical seat 8 and tubular member 17, which accurately centers and locks such tubular member in the shank bore 6 and thus accurately centers the inner end of the body member 4.

Adjacent the outer end of the body member 4 there is provided an annular flange or shoulder 40 which not only acts as a stop to determine the maximum extent to which the dial member 11 can be moved to the right along the body member 4, but also provides a shoulder against which a collet chuck or a cutting tool, such as a shell mill, end mill, or boring bar may be secured. In the form shown in FIGS. 1 and 2, the shoulder 40 is provided with a plurality of slots 41 in which are mounted keys 42 by means of suitable fasteners 43. Disposed over the outer end of the body member 4 is a shell mill 44, for example, having radial slots 45 adapted to fit over the keys 42 so that relative rotational movement between the body member 4 and shell mill 44 is precluded during a cutting operation. The shell mill is held firmly against the shoulder 40 to preclude relative axial movement between such shell mill 44 and body member 4 by means of a thrust plate 46 and a locking screw 47 threadedly engaging an axial bore 48 in the outer end of the body member. The shell mill 44 is provided with a plurality of longitudinal cutting blades or teeth 49 in the outer surface thereof.

As shown in FIG. 4, the dial member 11 is provided with a plurality of graduations 52 in the outer surface thereof for accurately determining the amount of axial movement of the dial member along the body member 4 when such dial member is rotated. The spacing of such graduations and the amount of dial advance per revolution may be selected as desired.

In FIG. 1 the tool holder is shown locked in the completely axially retracted position. Should it be desired axially to advance the cutting element 44 to the right with respect to some fixed reference point on the housing of the tool holder, it is first necessary to loosen the locking screw 25 so that the dial member 11 may be rotated. The dial member 11 is provided with sockets 53 for a spanner wrench or the like to aid the operator in turning the dial member 11. With the locking screw 25 loosened, the dial member 11 may readily be rotated in a direction to advance the same axially to the left, the amount of such dial movement as measured by the graduations 52 thereon with respect to a vernier graduation 54 on the outer surface of the housing being the amount of axial advancement of the cutting element 44 toward the right.

When the desired amount of adjustment of the cutting tool is obtained, the locking screw 25 is retightened until the wedge rings 30 and 18 are again firmly engaged with the respective seats 34 and 19 in the manner previously discussed. Such engagement accurately centers the body member 4 with respect to the axis of the bore 3 and locks the body member 4 against both radial and axial movement.

Referring now to FIGS. 5 and 6, the form of the tool holder 1' shown therein is quite similar to the tool holder 1 just described and operates in substantially the same manner. Accordingly, the same or similar parts are identified by the same reference numerals followed by a prime symbol ('). However, the construction of tool holder 1' is slightly different from tool holder 1. For example, the keys 12', rather than being in slots in the body member 4', are disposed in slots 55 in the tubular member 17', such keys slidably engaging keyways or slideways 56 in the shank portion 5'. Moreover, the tubular portion 17' extends substantially the entire length of the shank portion, while in the FIG. 1 embodiment such tubular member 17 merely extends part of the length of the shank portion. Further, the keys 42', rather than being mounted in slots on the front face of the annular shoulder 40', are mounted on the outer surface of such shoulder by means of suitable fasteners 58, such keys extending axially beyond such shoulder.

It can now be seen that the above-disclosed tool holder embodiments provide a relatively simple means for adjustably holding a cutting element and the like with a high degree of accuracy. Not only do the split wedge rings 18 and 30 and 18' and 30' effectively center the body member 4 and 4' of the tool holder with respect to the axis of a bore in the housing 2 and 2', but such split wedge rings being initially in snug engagement with the body member, eliminate radial play and consequent eccentric mounting as is possible in known constructions wherein the conical dial member has threaded engagement with the body member.

In the case of a tape or punched card controlled machine tool, a plurality of pre-set tool holders will be provided for automatic and quick sequential mounting on the machine tool spindle for accurate reaming, milling, boring, and like successive operations on a work piece.

Other modes of applying the principles of the invention may be employed, change being made as regards the details described, provided the features stated in any of the following claims or the equivalent of such be employed.

I, therefore, particularly point out and distinctly claim as my invention:

1. An axially adjustable tool holder comprising a tubular housing, a body member in said housing extending axially therebeyond, means operative to prevent relative rotational movement between said housing and body member, a dial member in threaded engagement with said body member beyond said housing for axial movement therealong, a split tapered wedge ring disposed on said body member between said housing and said dial member, and means for drawing said body member axially into said housing to compress said split wedge ring into tight engagement with said body member and said housing and dial member.

2. A tool holder for adjustably holding a cutting tool and the like comprising a housing, a body member disposed in said housing for relative axial movement therein, said body member extending axially beyond said housing, means for maintaining the relative rotational positions of said housing and body member, a dial member in threaded engagement with said body member beyond said housing, a split ring disposed around said body member between one end of said housing and said dial member, said split ring having a tapered surface which is adapted to engage a complemental tapered surface in said housing, means for mounting a cutting tool on said body member, and means for drawing said body member into said housing to force said split ring into tight engagement with said complemental tapered surface, thereby compressing said split ring into tight engagement with said body and said housing member and dial member.

3. The tool holder of claim 2 wherein said means for maintaining the relative rotational positions of said housing and body member comprises a key on said body member or housing engaged in a key way in said housing or body member.

4. The tool holder of claim 2 wherein said drawing means includes a second split ring disposed adjacent the other end of said housing, said second split ring having a tapered surface on the inner end thereof which is adapted to engage a complemental tapered seat in said housing, a thrust washer disposed adjacent the outer end of said second split ring, and a screw extending through said thrust washer and threadedly engaging said body.

5. The tool holder of claim 2, wherein said threads on said body are acme threads, the crests of which are adapted to be tightly engaged by said split ring.

6. An axially adjustable tool holder comprising a housing member, a cylindrical bore in said housing member, a body axially movably received within said bore, said body extending axially beyond one end of said housing member, said housing member having a shank portion projecting from the other end thereof, a longitudinal bore in said shank portion concentrically disposed with respect to said housing bore, means disposed in said tool holder for precluding relative rotational movement between said body and said housing member, said body having a tubular portion projecting therefrom into said shank bore, a dial member threadably engaging said body beyond said housing, a first split wedge ring disposed about said body between said housing and said dial member, said split wedge ring having a tapered portion which is adapted to engage a correspondingly tapered portion of said housing member, a second split wedge ring disposed about said tubular portion, the inner end of said second split wedge ring having a tapered portion which is adapted to engage a correspondingly tapered portion on said shank portion, and means for drawing said body into said housing member to force said first and second split wedge rings into tight engagement with said tapered portions, respectively, thereby compressing said first wedge ring into tight engagement with said body and compressing said second wedge ring into tight engagement with said tubular portion.

7. The tool holder of claim 6 wherein said drawing means comprises a thrust washer disposed adjacent the outer end of said second split wedge ring, and a locking screw extending through said thrust washer and threadably engaging said tubular portion.

8. The tool holder of claim 6, further including an annular shoulder on said body beyond said dial member, and means for fixedly mounting a cutting tool on said annular shoulder.

9. The tool holder of claim 6, wherein said means for precluding relative rotational movement between said body and housing comprises a key projecting radially from said body, and a longitudinally extending key way in the wall of said housing bore in which said key is axially slidably engaged.

10. The tool holder of claim 6, wherein said means for precluding relative rotational movement between said body and housing comprises a key projecting radially from said tubular portion which is slidably disposed in a longitudinally extending key way in said shank portion.

No references cited.

WILLIAM W. DYER, Jr., *Primary Examiner.*